Figure 1:
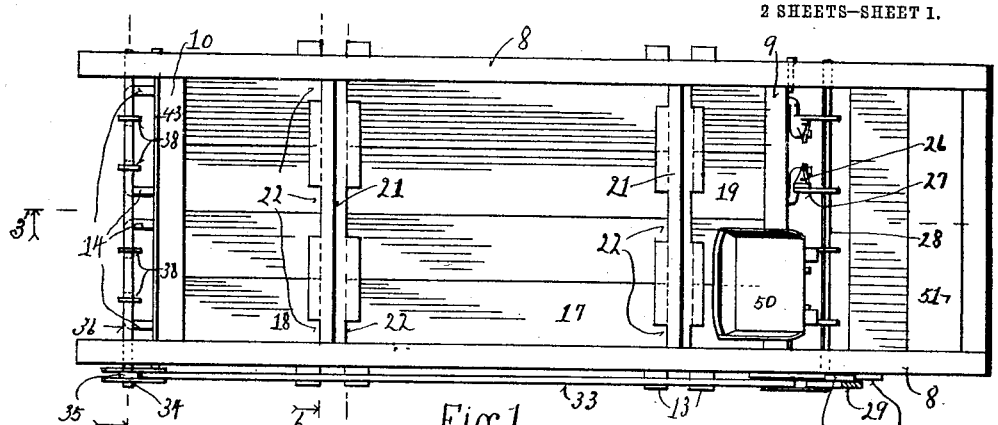

C. C. CRABB.
CUT-UNDER WAGON DUMP.
APPLICATION FILED MAY 1, 1914.

1,108,142.

Patented Aug. 25, 1914.
2 SHEETS—SHEET 1.

Witnesses

Inventor
Carl C. Crabb
By J. A. Rauen
Atty.

C. C. CRABB.
CUT-UNDER WAGON DUMP.
APPLICATION FILED MAY 1, 1914.
1,108,142.
Patented Aug. 25, 1914.
2 SHEETS—SHEET 2.
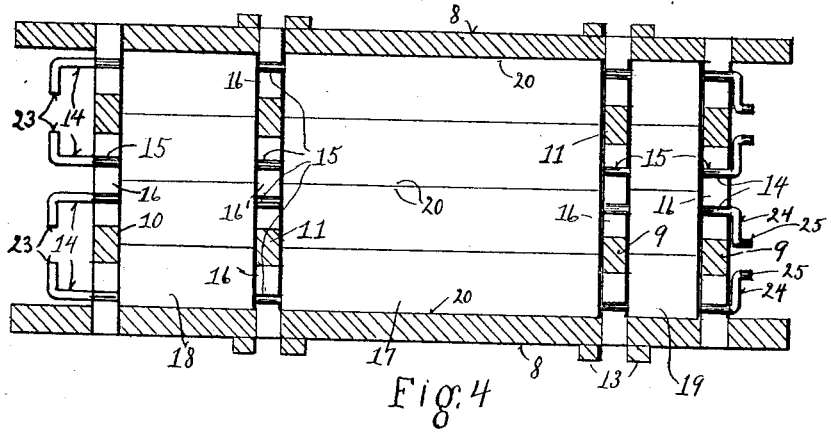
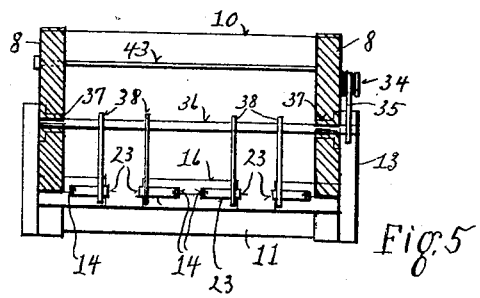
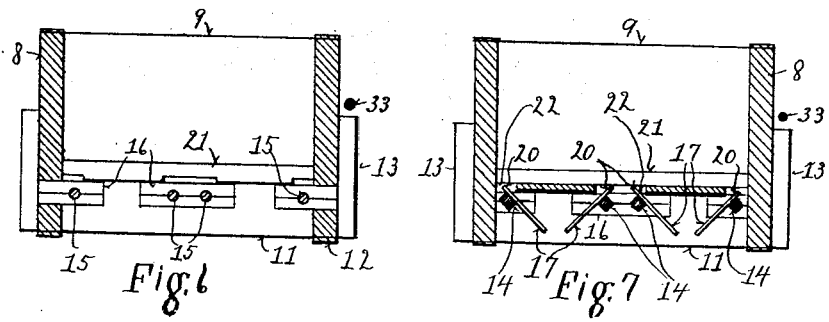
Witnesses
Inventor
Carl C. Crabb
By J. A. Rosen
Atty

UNITED STATES PATENT OFFICE.

CARL C. CRABB, OF TOPEKA, KANSAS.

CUT-UNDER-WAGON DUMP.

1,108,142.  Specification of Letters Patent.  Patented Aug. 25, 1914.

Application filed May 1, 1914. Serial No. 835,611.

*To all whom it may concern:*

Be it known that I, CARL C. CRABB, a citizen of the United States, residing at Topeka, in the county of Shawnee and State of Kansas, have invented certain new and useful Improvements in Cut-Under-Wagon Dumps, of which the following is a specification.

The object of my invention is to improve generally upon wagon dump beds, to provide a strong, simple, durable, and efficient arrangement of the bottom of a cut-under wagon dump bed and for closing and releasing the bottom, to provide for partially opening the bottom so that the load may be scattered, and to provide the parts, improvements, and combinations hereinafter set forth and claimed. And my invention comprises certain parts, improvements, and combinations relating to the bed of a wagon dump.

In the drawings accompanying and forming part of this specification and in the description of the drawings I have shown my invention in its preferred form and what I deem to be the best mode of applying the principles thereof; but it is to be understood that within the scope of the appended claims I contemplate changes in form, proportions, and materials, the transposition of parts, and the substitution of equivalent members, without departing from the spirit of my invention.

Figure 2:
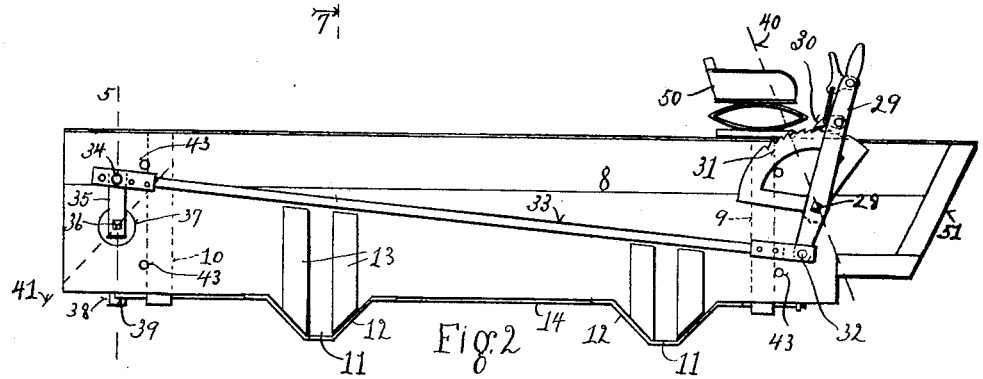
Figure 3:
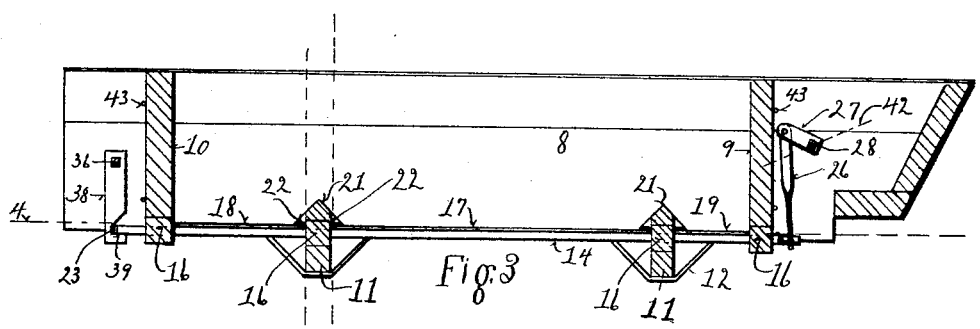

Figure 1 is a plan view of a wagon dump bed made in accordance with the principles of my invention, the ratchet lever being shown in section. Fig. 2 is a side elevation. Fig. 3 is a vertical central longitudinal sectional elevation. Fig. 4 is a sectional plan approximately on the plane indicated by the line 4 in Fig. 3. Fig. 5 is an end view, parts being shown in section as indicated by the line 5 in Fig. 2. Fig. 6 is a transverse section on a plane indicated by the line 6 in Fig. 1. Fig. 7 is a transverse section approximately on a line 7 in Fig. 1.

Similar reference characters indicate similar parts throughout the several views.

8 are the sides and 9 and 10 the front and rear end gates, of the wagon bed.

11 are the bolsters forming part of the bed and adapted to hold the bottom high above the wagon bolsters, the use of a false bolster being also contemplated where it is desired to raise the bed still higher above the bolsters of the running gear.

12 are straps to reinforce the bolsters and sides, and 13 are the cleats between which the stakes engage.

14 are four rods, square in cross section throughout their main lengths, and rounded to form journals where they pass through and find bearings in the boxings 16 in the bolsters and end gates, as shown at 15. To the upper face of each rod is secured, as by riveting, a strong sheet metal plate 17, fitting between the bolsters, another plate 18 fitting between the rear bolster and rear end gate, and another plate 19 fitting between the front bolster and the front gate. In this manner each rod carries a three-piece door swinging on a horizontal pivot extending lengthwise of the bed, each door having clearance for the two bolsters. The doors are arranged in two pairs, each pair covering one-half of the bottom, and each door covering one-quarter of the bottom, divided by parallel lines running lengthwise of the bed. Each plate is so attached to the rod as to have a lip 20 extending along the side of the rod opposite its main portion, the lips of the two outside doors butting against the sides 8 the lips of the two inside doors butting against each other, when the doors are closed. The upper edge of the bolster is formed with an inverted V-shaped ridge 21, whose edges overlap the adjacent ends of the plates of the several doors, but these overlapping edges are cut away, as shown at 22, above the rods and the lips 20, so as to permit the main portion of each door to be tilted downwardly. When the doors are in closed position, these overhanging bolster lips prevent the contents of the bed from sifting through between the bolsters and the plate ends; and they are specially desirable where sand or other fine material is contained in the bed. The rear ends of the rods of each pair are turned at right angles toward each other, as shown at 23, and their front ends are similarly turned toward each other and then forwardly again, as shown at 24 and 25. The front end of each rod is connected by means of a link 26 with an arm 27 secured on a shaft 28 mounted in the front end of the bed between the sides. To the shaft is secured an operating lever 29 on which is a pawl 30 for engagement with the ratchet 31 in the usual manner. The lower end of the operating lever is pivoted at 32 to the forward end of a rod 33, whose rear end is pivoted at 34 to an arm 35 secured to a shaft 36 mounted in suitable boxings 37 between the sides at the rear and carrying four latches 38, each of which has a notch 39 for engagement with the respective rear ends of the rods 14.

The drawings except Fig. 7, show the parts in normal position with the doors closed. The doors are supported in this position both at the front end and also at the rear end. To dump the load, the ratchet is released so as to permit the lever to shift to the position indicated by the dotted line 40, which brings the latches to the position 41, and the arms 27 to the position 42, thus allowing the doors to open wide enough to dump the load. To close the doors, the lever is pushed forward. If it is desired to scatter the load, this may be done by only partially opening the doors by letting the lever go back only a few notches.

43 are end gate rods, or tie-rods, for holding the sides in proper position.

50 is a seat for the driver, and 51 is a foot rest which also forms a convenient receptacle for feed, tools, and other matter which may be stowed therein.

It is a feature of my invention that I provide a cut-under dump bed in which the load is carried by both the front and rear wheels, that is, on both sides of and between the two axles and bolsters. It is possible to turn until the front wheel strikes against the reach, making a very short turn possible. Also my dump is strong, durable, quick-acting, and convenient; it can be made with a very close-fitting and freely acting bottom.

Having thus described my invention, what I claim as new and desire to secure by Letters Patent is:

1. The combination of sides and end gates, two transverse bolsters between the ends, four rods journaled in the end gates and bolsters, a three-piece sheet metal door secured to each rod and fitting between the bolsters and between the bolsters and the respective ends and each door having a lip extending along the rod opposite to the main portion of the door, two of said lips butting against the sides and two butting against each other, and said bolsters being formed with inverted V-shaped ridges with lips overlapping adjacent ends of the doors and cut away to provide clearance for said first-named lips, and means for operating said doors and for locking them in closed position.

2. The combination of sides and ends, transverse bolsters between the ends, a series of pairs of rods journaled lengthwise of the bed in the bolsters and in the ends, the ends of said rods being bent at substantially right angles, plates secured to the rods and fitting between the bolsters and between the bolsters and the respective ends, a rod transversely disposed and journaled in the sides at each end, a series of arms mounted on the front rod, a link connecting each arm with the front turned end of the first-named rods, respectively, a lever secured to said front rod, a ratchet and pawl for said lever, a series of latch bars secured to the rear rod for engaging the respective rear turned ends, and a rod operatively connecting the lever with said rear rod, said latch bars being adapted to engage the said ends when the doors are closed and adapted to be disengaged from said ends upon shifting the lever.

In testimony whereof I have affixed my signature in presence of two witnesses.

CARL C. CRABB.

Witnesses:
BLANCHE SHEIBLEY,
J. M. STARK.